United States Patent [19]
Williams

[11] 4,369,957
[45] Jan. 25, 1983

[54] DEVICE FOR CLAMPING AND ALIGNING PLATES TO BE JOINED IN SELECTED ANGULAR RELATIONSHIP

[76] Inventor: Stanley B. Williams, 2088 E. Empire, Lot 151, Benton Harbor, Mich. 49022

[21] Appl. No.: 289,765

[22] Filed: Aug. 3, 1981

[51] Int. Cl.³ ............................................. B23Q 1/00
[52] U.S. Cl. ...................................... 269/41; 269/49; 269/156; 269/164; 269/902
[58] Field of Search ..................... 269/49, 41, 43, 156, 269/164, 270, 246, 902; 219/158; 228/49 C, 49 R

[56] References Cited

U.S. PATENT DOCUMENTS

| | | | |
|---|---|---|---|
| 1,309,067 | 7/1919 | Heltzel | 269/49 |
| 2,669,957 | 2/1954 | DeVogt | 269/41 |
| 4,201,376 | 5/1980 | Philips | 269/164 |

FOREIGN PATENT DOCUMENTS

| | | | |
|---|---|---|---|
| 2836506 | 3/1980 | Fed. Rep. of Germany | 269/41 |
| 1473650 | 5/1977 | United Kingdom | 269/41 |

*Primary Examiner*—Robert C. Watson
*Attorney, Agent, or Firm*—Gary, Juettner & Pyle

[57] ABSTRACT

A device for clamping and aligning a pair of plates in selected angular relationship, so that the plates may be joined by welding or the like, clamps the same in the selected angular relationship with adjacent edges thereof in close proximity. The device holds the plates for being joined at one or more spaced points along their adjacent edges, whereafter the device is removable to permit the plates to be joined along the entirety of the length of their edges.

7 Claims, 3 Drawing Figures

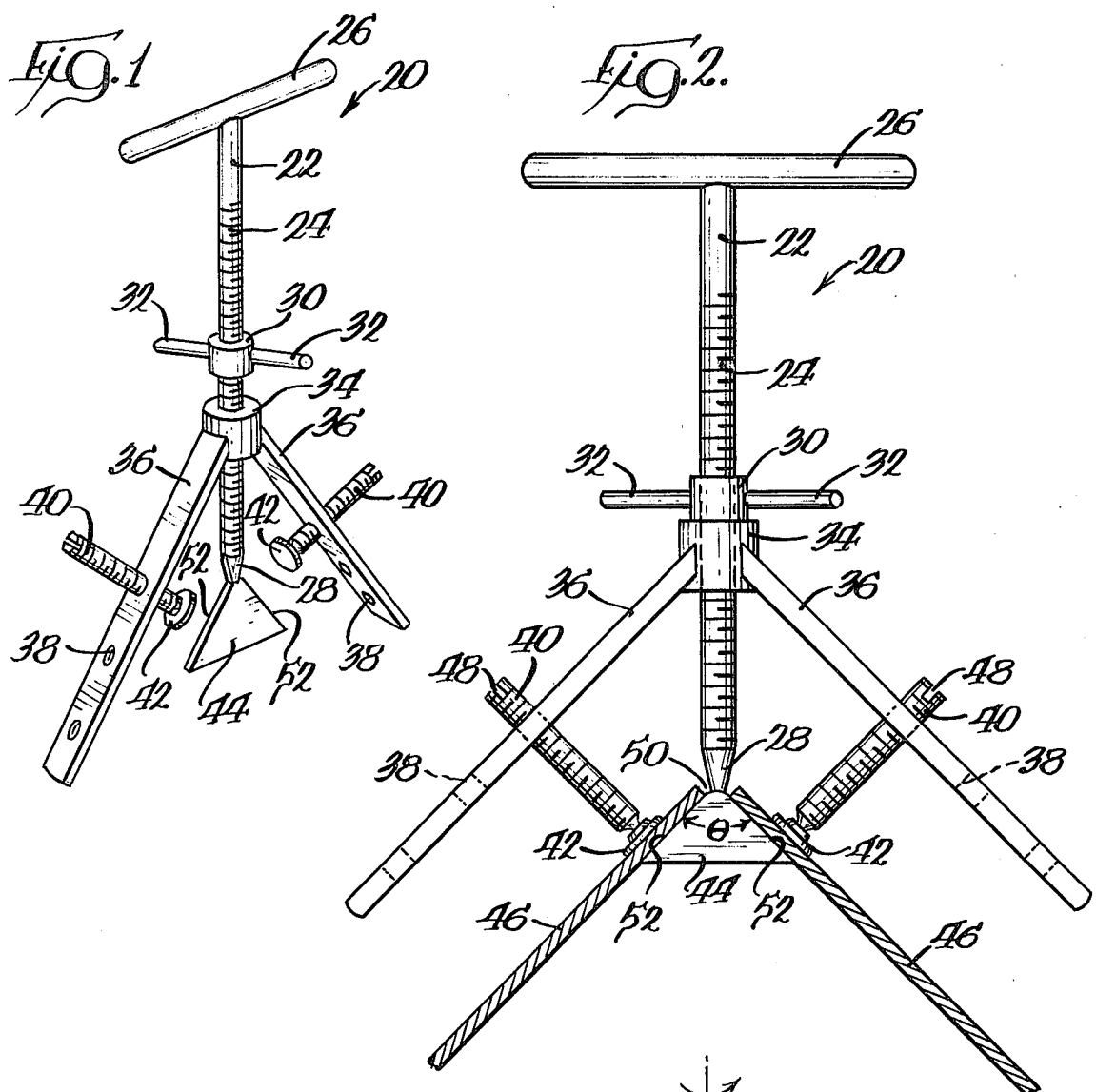
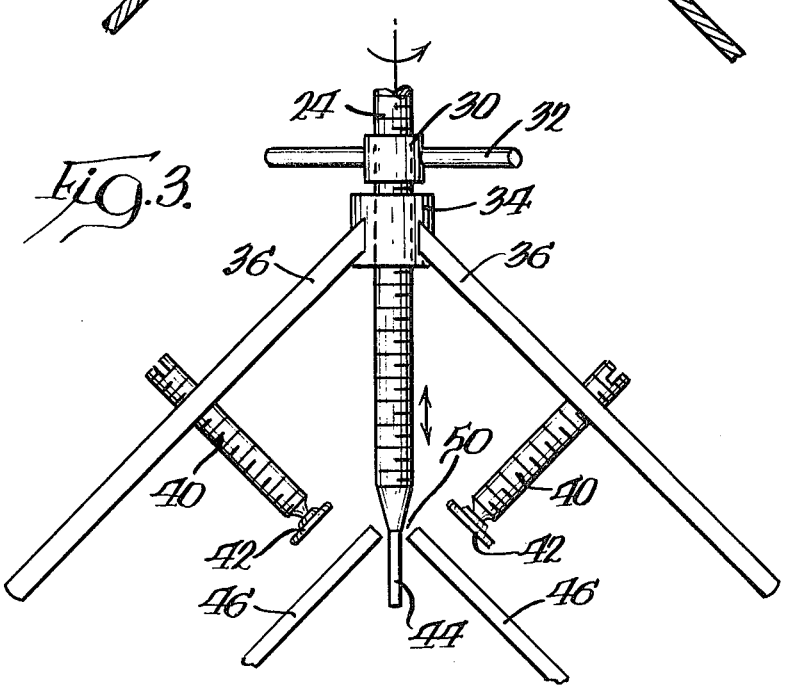

DEVICE FOR CLAMPING AND ALIGNING PLATES TO BE JOINED IN SELECTED ANGULAR RELATIONSHIP

BACKGROUND OF THE INVENTION

The present invention relates to a device for clamping and aligning a pair of plates in angular relationship so that the same may be joined by welding or the like.

In the construction of metal walls, walkways, bulwarks, closures and the like, separate metal plates are often joined along their edges by welding to form a structure. To join the plates, some means must be provided for holding the plates side-by-side with their adjacent edges closely spaced for welding. The positioning may be accomplished by two individuals, each of whom holds a separate one of the plates, while a third individual welds the plates together. In the alternative, supports such as wooden beams may be used to hold the plates in aligned relationship. However, such positioning techniques are, to say the least, cumbersome, inconvenient and time intensive, and usually require the combined effort of more than one individual.

One exemplary type of device which enables a single individual to both align and weld a pair of plates in side-by-side relationship is disclosed in my U.S. Pat. No. 4,175,734, issued Nov. 27, 1979. The device disclosed therein, however, is useful only for holding plates in edge-to-edge coplanar relationship for joining, but does not permit clamping and alignment of plates in an angular or other than coplanar relationship, as is often required in many welding operations.

OBJECTS OF THE INVENTION

An object of the present invention is to provide a device for supporting a pair of plates to be joined in selected angular relationship, with adjacent edges of the plates closely spaced so that they may be joined by welding.

A further object of the invention is to provide such a device which is easily and rapidly connectable and disconnectable with and from plates to be supported and joined.

SUMMARY OF THE INVENTION

In accordance with the present invention, a device for clamping a pair of plates in closely spaced edge to edge and angularly aligned but not coplanar relationship so that the plates may be joined along their edges by welding or the like, comprises first clamp means engageable with surfaces of the plates to opposite sides of an inside corner defined when adjacent edges of the plates are in closely spaced relationship; second clamp means engageable with surfaces of the plates on opposite sides thereof when the plates are in the closely spaced relationship; and means for moving said first and second clamp means toward and away from each other to grip the plates therebetween, to hold the plates in position for joining along their adjacent edges and to release the plates for removal of the device therefrom, said first and second clamp means being configured to move the plates to and to hold the plates in a selected angular relationship when the same are moved together and grip the plates.

In a preferred embodiment of said device, said first clamp means is triangular shaped, has two side edges and engages the plates along said side edges and the included angle between said two edges determines the angular relationship of the plates when clamped. Said device includes an elongate rod, said first clamp means is secured at the apex between said two side edges to one end of said rod and said second clamp means is movable along said rod. Said moving means moves said second clamp means along said rod toward and away from said first clamp means and said first clamp means and said rod thereat are extendable through the space between the plates when the plane of said first clamp means extends along the length of the space.

The device thus provides an improved means for conveniently and economically clamping together a pair of plates so that they may be joined by welding or the like in a selected angular relationship. By virtue of the ease of operation of the device, joining of plates may be accomplished by a single individual and without need for elaborate or cumbersome exterior supports.

The foregoing and other objects, advantages and features of the invention will become apparent from the following detailed description, when taken in conjunction with the accompanying drawings.

BRIEF DESCRIPTION OF THE DRAWINGS

FIG. 1 is a perspective view of a preferred embodiment of the device of the invention for clamping and aligning a pair of plates to be joined in selected angular relationship;

FIG. 2 is a side elevation view, illustrating the device clamping a pair of plates in angular relationship in order that the plates may be joined along adjacent edges thereof, and FIG. 3 is a partial side elevation view, showing the manner in which the device is connected and disconnected with and from the plates.

DETAILED DESCRIPTION

Referring to the drawings which illustrate salient features of a preferred embodiment of the invention, and in particular to FIG. 1, a device for holding and aligning a pair of metal plates to be joined in selected angular relationship is indicated generally at 20 and comprises an elongate rod 22 having a medial threaded portion 24, a T-handle 26 at an upper end thereof and a relatively narrow extension 28 at a lower end. An adjustment lever 30 is threaded about and rotatably movable along the threaded portion of the rod by means of a pair of handles 32, and a sleeve 34 receives the threaded section of the rod. The sleeve is sized to permit it to move freely along the rod, and a pair of legs 36 connect with opposite sides of the sleeve and extend downwardly and outwardly therefrom. Each leg has a plurality of threaded passages 38 extending therethrough at spaced intervals therealong, and adjustment studs 40, each having a pad or foot 42 pivotally mounted at an inner end thereof, are threadably received within one of the passages 38 in each leg 36. A relatively narrow wedge or triangular shaped guide or clamp 44 is fastened at an apex thereof to the lower end of the extension 28, and the arrangement is such that upon clockwise rotation of the adjustment lever 30 (as viewed from above) the sleeve 34 is moved toward the guide 44, and upon counterclockwise rotation the sleeve is free to move away from the guide.

In use of the clamping device, and referring also to FIG. 2, to clamp or hold a pair of metal plates 46 in aligned and selected angular relationship for joining along adjacent edges thereof, the adjustment lever 30 is moved upward along the rod toward the handle 26 to permit the sleeve 34 to move away from the guide 44. At the same time, and if necessary, the adjustment studs 40 are rotated, for example by means of a screw driver inserted into slots 48 in outer ends thereof, to move the pads 42 away from the guide 44. The plates are then moved together to position edges thereof in closely spaced adjacent relationship about the extension 28, such that the guide is to the interior of the plates within the inside corner defined thereby and the pads of the adjustment studs are to the exterior of the plates. In the alternative, the plates may first be somewhat roughly positioned with their edges in the closely spaced relationship, and the guide then positioned to interior of the plates by rotating it so that it extends along the length of the opening between the adjacent edges of the plates, extending it through the opening to interior of the plates and then rotating it until it extends transversely of the opening. To this end, the opening or space 50 defined between adjacent edges of the plates is relatively small, yet is greater than the diameter of the extension 28 or the thickness of the guide.

At this point, the plates are only roughly angularly aligned with one another. To precisely angularly align the plates and secure them against movement in the closely spaced relationship for being joined, the adjustment lever 30 is rotated to move the sleeve 34 toward the clamping guide 44 and the adjustment studs 40 are rotated to move the pads 42 against outer surfaces of the plates, until the pads 42 and side edges 52 of the guide 44 engage outer and inner surfaces of the plates and grip the plates therebetween in aligned angular relationship.

As is apparent, the angular orientation of the plates, as clamped, is determined by the angle $\theta$ of the apex of the guide 44, or the included angle between the side edges 52 of the guide. Depending upon the particular application the angle $\theta$ may have any selected value, such for example as 90° where the plates are to be connected at a right angle. Also as is apparent, where the plates are otherwise unsupported except by the clamping device 20, the adjustment studs 40 are preferably threaded through inwardly positioned passages 38 in the legs 36, so that the pads 42 engage surfaces of the plates directly opposite from the edges 52 of the guide to provide clamping stability and prevent rotation of the plates toward each other. In the circumstance where opposite ends of the plates are secured against movement toward each other, or where the plates are particularly heavy and not prone to easy movement, then the adjustment studs may be extended through passages located toward outer ends of the legs.

Also, although only a single clamping device 20 is illustrated, it is understood that alignment and clamping of the plates may advantageously be accomplished through use of two or more of the devices, for example a plurality of the devices at spaced intervals along the length of the adjacent edges of the plates. Use of multiple clamping devices provides improved support for the plates and ensures that the space therebetween is maintained uniform along the entire length of the edges, whereby accurate positioning and angular alignment of the plates is ensured.

With the plates firmly clamped in the aligned and selected angular relationship as shown in FIG. 2, their edges may then be temporarily secured together, for example by tack welds at opposite ends of the edges. Where multiple clamping devices 20 are used, in addition to tack welds at opposite ends of the edges, tack welds positioned medially of adjacent pairs of devices may also be employed.

After tack welds have been made between the edges of the plates, as shown in FIG. 3 the clamping device or devices may readily be removed, with the tack welds then continuing to hold the plates in their aligned angular relationship. Removal is accomplished simply by rotating the adjustment lever 30 counterclockwise to free the guide 44 and the pads 42 for movement apart and out of clamping engagement with the plates. This enables the guide to be rotated by the handle 26 to a position whereat it lies in the plane of the opening 50, whereupon the guide and extension 28 may then be withdrawn through the opening. Thereafter, and after all of the clamping devices have been removed, a continuous weld may be made along the entire length of the edges of the plates to seal the opening and join the plates together.

The invention thus provides an improved means for conveniently and economically clamping together a pair of plates to enable the same to be joined by welding or the like in a selected angular relationship, while simultaneously ensuring that a proper orientation between adjacent edges of the plates will be maintained along the length thereof. By virtue of the ease of operation of the device, joining of plates may be accomplished by a single individual and without need for elaborate or cumbersome exterior supports.

While embodiments of the invention have been described in detail, various modifications and other embodiments thereof may be devised by one skilled in the art without departing from the spirit and scope of the invention, as defined in the appended claims.

What is claimed is:

1. A device for clamping a pair of plates in closely spaced edge to edge and angularly aligned but not coplanar relationship so that the plates may be joined along their edges by welding or the like, comprising first clamp means engageable with inner surfaces of the plates to opposite sides of an inside corner defined when adjacent edges of the plates are in closely spaced relationship; second clamp means engageable with outer surfaces of the plates generally opposite from the first clamp means when the plates are in the closely spaced relationship; and means for moving said first and second clamp means toward and away from each other to grip the plates therebetween, to hold the plates in position for joining along their adjacent edges and to release the plates for removal of the device therefrom, said first and second clamp means being configured to move the plates to and to hold the plates in a selected angular relationship when the same are moved together and grip the plates, wherein said first clamp means is relatively thin for insertion and removal thereof into and from the inside corner of the plates through the space between adjacent edges of the plates when the plane of said first clamp means extends along the length of the space, and for engagement of the plate inner surfaces to opposite sides of the inside corner when the plane thereof extends generally perpendicular to the length of the space, said first clamp means being triangular shaped, having two side edges and engaging the plates along said side edges, the included angle between said two side edges determining the angular relationship of the plates when clamped, and wherein said second clamp means is movable against said plates in directions generally perpendicular to respective ones of said first clamp means side edges.

2. A device for clamping a pair of plates is closely spaced edge to edge and angularly aligned but not coplanar relationship so that the plates may be joined along their edges by welding or the like, comprising first clamp means engageable with inner surfaces of the plates to opposite sides of an inside corner defined when adjacent edges of the plates are in closely spaced relationship; second clamp means engageable with outer surfaces of the plates generally opposite from the first clamp means when the plates are in the closely spaced relationship; and means for moving said first and second clamp means toward and away from each other to grip the plates therebetween, to hold the plates in position for joining along their adjacent edges and to release the plates for removal of the device therefrom, said first and second clamp means being configured to move the plates to and to hold the plates in a selected angular relationship when the same are moved together and grip the plates, wherein said first clamp means is relatively thin for insertion and removal thereof into and from the inside corner of the plates through the space between adjacent edges of the plates when the plane of said first clamp means extends along the length of the space, and for engagement of the plate inner surfaces to opposite sides of the inside corner when the plane thereof extends generally perpendicular to the length of the space, said first clamp means being triangular shaped, having two side edges and engaging the plates along said side edges, the included angle between said two side edges determining the angular relationship of the plates when clamped, and including an elongate rod, said first clamp means being secured at the apex between said two side edges to one end of said rod and said second clamp means being movable along said rod, said moving means moving said second clamp means along said rod toward and away from said first clamp means and said first clamp means and said rod thereat being extendable through the space between the plates when the plane of said first clamp means extends along the length of the space.

3. A device as in claim 2, wherein said rod has threads along a medial portion thereof and said moving means includes an adjustment lever threaded onto said threaded portion and rotatably movable along said rod to move said second clamp means toward said first clamp means or to enable said second clamp means to move away from said first clamp means.

4. A device as in claim 2, wherein said second clamp means includes a sleeve having a passage therethrough, said rod extending through said sleeve and said sleeve being slidable along said rod, a pair of legs on opposite sides of said sleeve extending outwardly therefrom and toward said first clamp means, and an adjustment stud extending through each of said legs, said adjustment studs being movable in said legs to move ends thereof toward and away from said first clamp means and into and out of engagement with the plates, and wherein said rod has threads along a medial portion thereof and said moving means includes an adjustment lever threaded onto said threaded portion on the side of said sleeve away from said first clamp means and rotatably movable along said rod to move said second clamp means toward said first clamp means or to enable said second clamp means to move away from said first clamp means.

5. A device as in claim 4, wherein said legs of said second clamp means have an included angle which is substantially equal to the included angle between said two side edges of said first clamp means, and said adjustment studs extend through said legs in directions perpendicular to respective ones of said first clamp means side edges.

6. A device as in claim 4, wherein said ends of said adjustment studs are provided with enlarged pads or feet for engaging the plates.

7. A device as in claim 2, including a handle at an opposite end of said rod for facilitating handling of said device and turning of said rod and said first clamp means.

* * * * *